United States Patent

[11] 3,574,439

| [72] | Inventors | Detlef C. Gloge<br>Matawan;<br>Enrique A. J. Marcatili, Rumson, N.J. |
|---|---|---|
| [21] | Appl. No. | 761,954 |
| [22] | Filed | Sept. 24, 1968 |
| [45] | Patented | Apr. 13, 1971 |
| [73] | Assignee | Bell Telephone Laboratories, Incorporated<br>Murray Hill, Berkeley Heights, N.J. |

[54] MULTIPLE BEAM TRANSMISSION SYSTEM
4 Claims, 5 Drawing Figs.

[52] U.S. Cl. .................................................... 350/31,
350/45, 350/54, 350/96, 350/169
[51] Int. Cl. ........................................................ G02b 27/00
[50] Field of Search ........................................... 350/96
(WG), 31, 32, 33, 8, 45, 54, 167, 213, 169;
353/30, 31, 32

[56] References Cited
UNITED STATES PATENTS
1,114,232  10/1914  Cheron ........................ 350/(213UX)
3,410,623  11/1968  Kogelnik ...................... 350/96
3,434,774  3/1969   Miller .......................... 350/96
3,468,598  9/1969   Ito ............................... 350/167X

OTHER REFERENCES

Kawakami et al. " Propagation Loss in a Distributed Beam Waveguide" Proceedings of the IEEE Dec. 1965, pp. 2148, 2149. 350-96 (WG)

Primary Examiner—John K. Corbin
Attorneys—R. J. Guenther and Arthur J. Torsiglieri ABSTRACT: Special multiplexing of a plurality of $N$ beams in a beam transmission system comprising a sequence of confocally spaced lenses is accomplished by directing the beams such that $p$ separate groups of $q$ beams are formed at odd lenses in said sequence of lenses, and $q$ separate groups of $p$ beams are formed at even lenses in said sequence, where $p$ and $q$ are integers greater than one and $p \times q = N$. The beams are resolved at the output end into $N$ separate beams. A similar arrangement can be employed using nonconfocally spaced lenses or a continuously focusing waveguide.

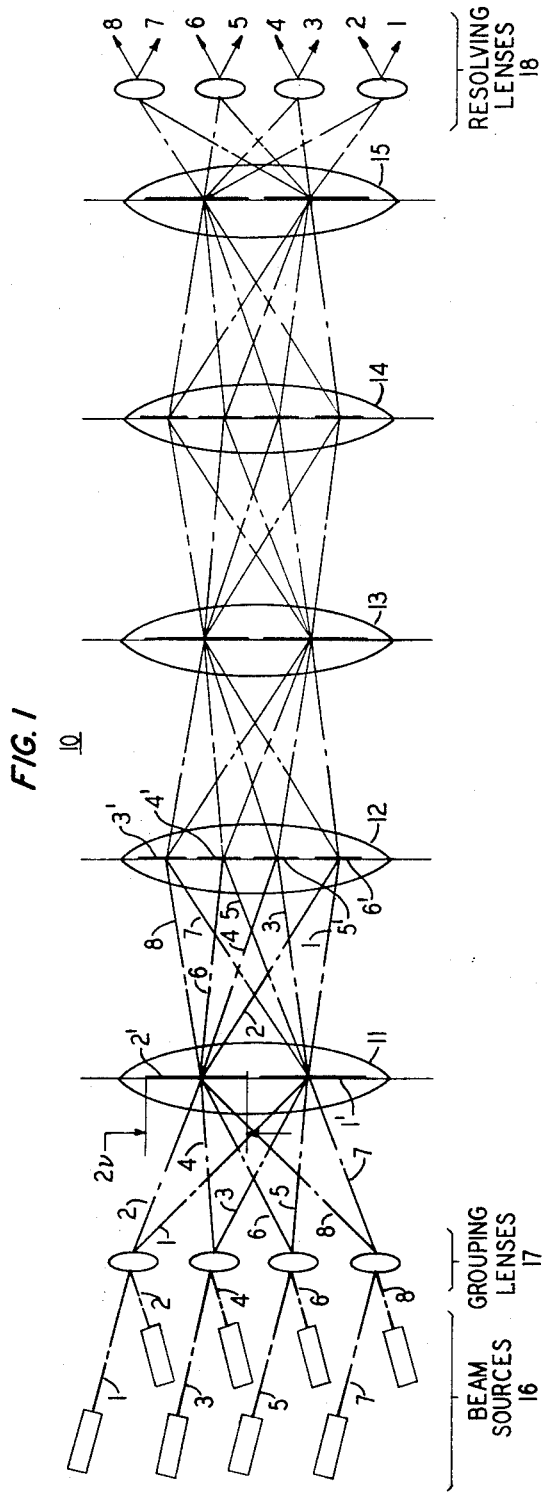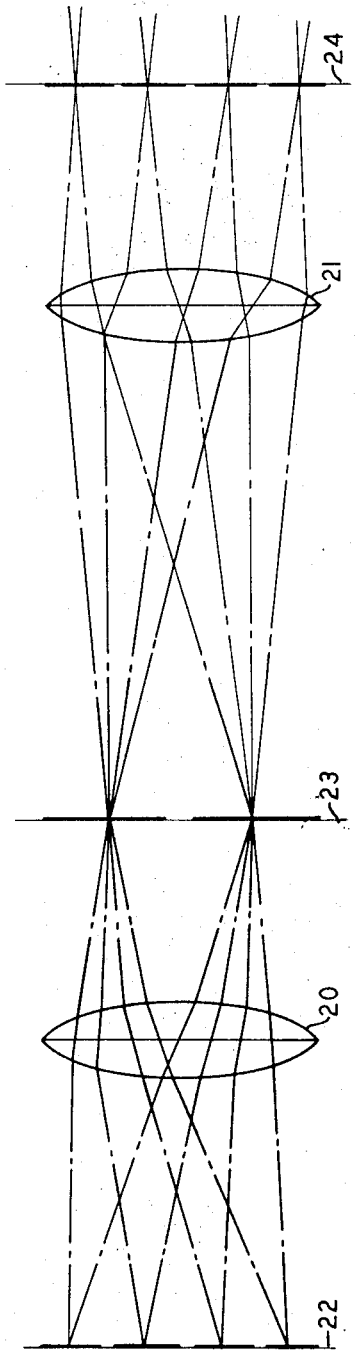

4 GROUPS OF
8 BEAMS EACH

8 GROUPS OF
4 BEAMS EACH 3,574,439

MULTIPLE BEAM TRANSMISSION SYSTEM

BACKGROUND OF THE INVENTION

The advent of the laser as a source of highly coherent and monochromatic electromagnetic wave energy in the infrared, visible and ultraviolet portions of the frequency spectrum, hereafter to be referred to collectively as "optical" waves, makes possible the use of such waves as the carrier signal in a communication system. However, the utilization of optical waves in this manner is dependent upon the availability of an efficient transmission system.

Typical among the present-day proposals for sending optical waves over long distances are systems employing sequences of dielectric lenses, periscopic mirrors, dielectric waveguides and gas lenses. Characteristically, each of these systems contemplates the guidance of a single beam of wave energy along a single guide axis. In all of such systems, means are advantageously included for sensing when the beam axis is improperly oriented and for redirecting the beam along the guide axis.

As is readily evident, the cost of transmitting information along such a system would be significantly reduced if, instead of utilizing the system in a manner to guide a single beam, a plurality of beams could be simultaneously transmitted therealong.

SUMMARY OF THE INVENTION

In accordance with the present invention the capacity of a beam waveguide is increased by spacially multiplexing a plurality of beams in such a way that they are resolvable at the output end of the system. Wave guidance is accomplished by means of sequence of lenses that are large compared to the diameter of the individual beams. At the input end of the system, means are provided for organizing the N beams to be multiplexed into a $q$ groups of $p$ beams each, and for directing one beam from each of said groups onto one of $p$ separate regions of the first lens in the sequence, where $p$ and $q$ are integers greater than one, and $p \times q = AN$. In a first embodiment of the invention, the lenses of the sequence are confocally spaced such that groups of $q$ beams are similarly directed onto $p$ separate regions of successive odd lenses in the sequence, while groups of $p$ beams are directed onto $q$ separate regions of the second and successive even lenses in the sequence.

At the output end of the waveguide, means are provided for resolving the beams into $N$ separate beams, directed along $N$ separate wavepaths.

While confocal spacing of the lenses has some advantages, this is not always practical or necessary. Where required, deviations of as much as ± 10 percent from confocal spacing can be used without adversely affecting the multiplex operation of the system. Similarly, a waveguide which provides continuous focusing, such as a gaseous waveguide, can also be used as the waveguiding medium in a spacially multiplexed system in accordance with the invention.

It is a feature of the invention that the beams are not confined to the center of the wavepath, but utilize the entire cross-sectional area of the waveguiding structure.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows a spacially multiplexed beam transmission system in accordance with the present invention employing confocally spaced lenses;

FIG. 2 shows a similar system wherein the lenses are not confocally spaced;

DETAILED DESCRIPTION

Figure 3:
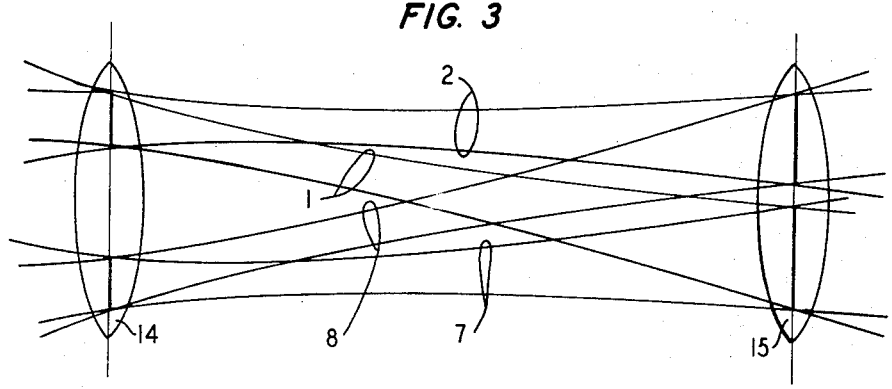
FIG. 3 shows a portion of the system of FIG. 1 and a number of the beams guided therealong.

Referring to the drawings, FIG. shows a spacially multiplexed beam transmission system in accordance with the present invention. For purposes of illustration and explanation, the waveguide 10 is shown comprising a sequence of five confocally spaced, double convex lenses 11, 12, 13, 14 and 15. At the input end, a plurality of eight beam sources 16, such as lasers, generate eight beams 1 through 8 represented by the correspondingly identified rays. The optical beams are organized into four groups of two beams each by means of four lenses, identified as grouping lenses 17. The grouping lenses are arranged so that one beam 1, 3, 5 and 7 from each of four different sources is directed onto a common region 1' of the first lens 11 in the sequence. Similarly, beams 2, 4, 6 and 8 are directed onto another common region 2' of lens 11. The plane in which the common regions lie is referred to as the nodal plane. In the confocally spaced system, the nodal planes are also the planes of the lenses.

Each of the common regions has a diameter $2\nu$ corresponding to the width of the multiplexed beams at lens 11. How closely these common regions can be spaced and, hence, the overall lens size is determined by the tolerable crosstalk. For convenience, each beam can be considered to be $k$ times greater than its $1/e^2$ width (assuming a Gaussian beam profile), where $k$ is chosen such that the crosstalk requirement is met when the common regions just touch. In practice, the main source of crosstalk is due to beam distortion and scattering, rather than the spread of the ideal beam. The factor $k$, therefore, will vary from guide to guide, according to the tolerances of the guiding components.

Upon traversing the first lens, the beams regroup by virtue of the deflection produced by the lens, into four groups of two beams each at the next lens 12. As above, each of the four newly-formed groups includes one beam from each of the two groups formed at lens 11. Thus, for example, beams 7 and 8 form one group at a common region 3' on lens 12, while beams 5 and 6, 3 and 4, and 1 and 2 form the remaining groups at common regions 4', 5' and 6', respectively. It will be noted that, in essence, the grouping lenses 17 are imaged at lens 12 by lens 11.

The process of grouping and regrouping the beams is repeated and continues along the waveguide. This process is automatic and is a result of the focus action of the lenses.

The beams are resolved at any position along the waveguide by means of a group of resolving lenses located at one of the nodal planes. In the illustrative embodiment of FIG. 1, a group of four resolving lenses 18 are located at the nodal plane following lens 15. The resolving lenses intercept the four groups of beams derived from lens 15 and redirect them along eight separate paths, corresponding to the eight input beams 1—8.

The use of eight beams, divided and grouped in the manner indicated, is merely intended to illustrate the technique of spacial multiplexing in accordance with the invention. More generally, any number of $N$ beams can be multiplexed by successively forming $p$ groups of $q$ beams each, and $q$ groups of $p$ beams each, where $p$ and $q$ are integers greater than one such that $$p \times q = N. \quad (1)$$

In the example described $p=4$, $q=2$ and $N=8$.

In the illustrative embodiment of FIG. 1 the lenses are confocally spaced and the nodal planes are formed in the planes of the lenses. While there are advantages to such an arrangement, as will be noted hereinbelow, confocal spacing is not a necessary condition. In general, the lens-to-lens spacing may deviate from the confocal spacing by as much as ± 10 percent without impairing the operation of the system. In such an arrangement, however, the nodal planes are formed between the lenses, as indicated in FIG. 2. This figure shows two lenses 20 and 21, and the common regions located in three nodal planes 22, 23 and 24 between the lenses.

The relationship between the system parameters and the maximum number of beams is given by $$N = \frac{\pi^4 A^4}{32 k^4 \lambda^2 \Delta^2} \qquad (2)$$

and $$\Delta = d/\sin \Phi, \qquad (3)$$

where $\lambda$ is the wavelength of the guided wave energy,
$A$ is the lens radius,
and $$\Phi = \cos^{-1}(1-d/2f).$$

The beam radii $\mu$ and $\nu$ at successive lenses are related by $$\nu = \frac{\Delta \lambda}{\pi \mu} \qquad (4)$$

Advantageously, the lenses are confocally spaced as this minimizes $\Delta$ (i.e., $\Delta = d$) and, thereby, maximizes the number of beams, $N$, that can be multiplexed using a given size lens. However, in any practical long distance transmission system, the lens-to-lens spacing will typically change where necessary to accommodate other system requirements. Hence, confocal spacing may not always be possible or desirable.

A second parameter influencing the system capacity is the factor $k$, which ideally would be equal to unity. However, to the extent that the lenses are less than perfect, the beams will be distorted and some of the energy scattered. Thus, the factor $k$ is typically greater than one and the system capacity correspondingly reduced.

In FIG. 1, the beams are represented by rays. FIG. 3, on the other hand, shows two of the lenses 14 and 15, and four of the beams 1, 2, 7 and 8, each of which is represented by a pair of lines which define the beam width at all points. As will be noted, the width of each beam is less at lens 11 than it is at lens 12.

Figure 4:
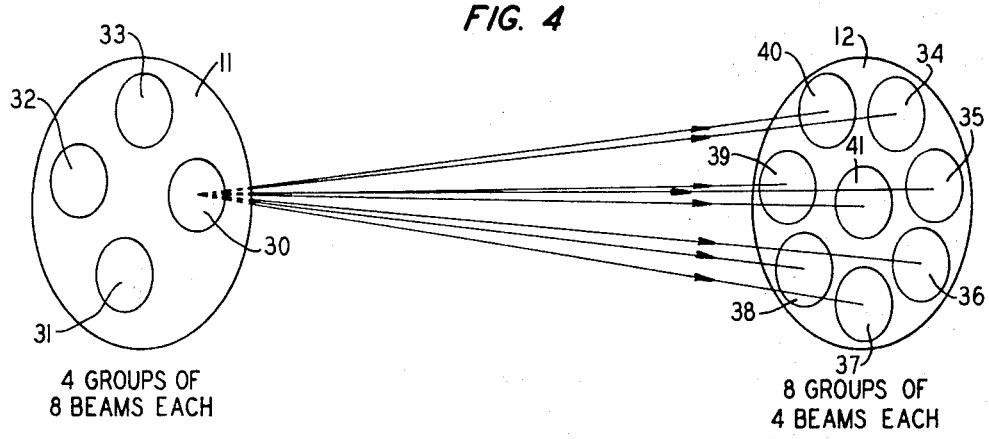
FIG. 4 shows a portion of the system of FIG. 1 in three dimensional perspective.

It will also be noted that FIG. 1 is a two-dimensional representation of a three-dimensional device. FIG. 4, accordingly, depicts two lenses 11 and 12 in perspective and, thereby, shows more fully the utilization of the lens surfaces. In particular, lens 11 is shown with four common regions 30, 31, 32 and 33 and lens 12 with eight common regions 34 to 41. If each common region on lens 11 includes a sufficient number of beams so that a beam is directed to each of the common regions on lens 12, the system will accommodate a total of 32 beams divided into four groups of eight beams each at lens 11, and eight groups of four beams each at lens 12.

Figure 5:
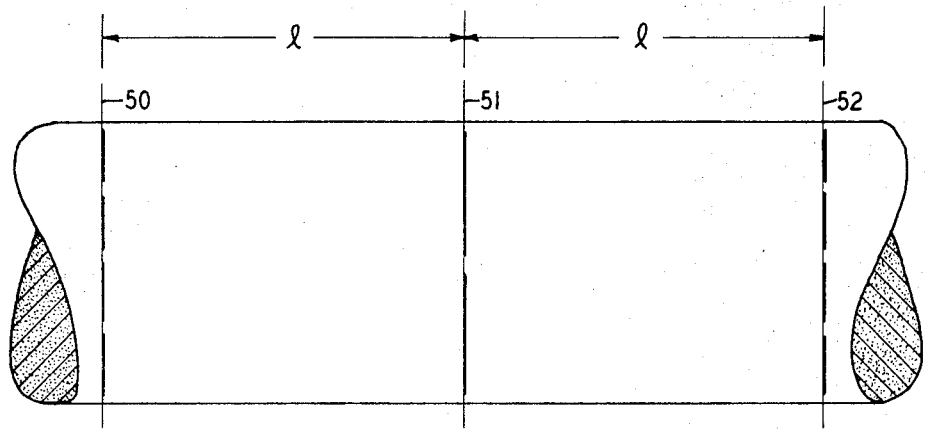
FIG. 5 shows a multiplexed system employing a continuously focusing waveguide.

FIG. 5 shows a portion of continuously focusing optical beam waveguide as, for example, is described in U.S. Pat. No. 3,434,744. In such a system the nodal planes 50, 51 and 52, containing the common regions are spaced apart a distance $l$ given by $$l = \frac{\pi}{2} \Delta \qquad (5)$$

In this equation, $\Delta$ is related to the refractive index profile of the waveguide by $$n = n_0 \left(1 - \frac{x^2}{2\Delta^2}\right) \qquad (6)$$

where $n_o$ is the refractive index along the axis of the waveguide, and $n$ is the refractive index at any distance $x$ off axis.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

We claim:

1. In an optical beam guidance system, the combination comprising:

a waveguide having a plurality of longitudinally spaced focusing members; and means for spacially multiplexing a plurality of $N$ beams for propagation along said waveguide; said multiplexing means comprising:

means for directing $p$ groups of $q$ beams each onto $p$ separate common regions lying in a first nodal plane along said waveguide;

said beams thereafter reforming under the focusing influence of said waveguide into $q$ groups of $p$ beams each at the second and successive even nodal planes along said waveguide, and into $p$ groups of $q$ beams each at successive odd nodal planes along said waveguide; and means located at the last nodal plane along said waveguide for resolving said grouped beams into $N$ independently directed beams, where $N = p \times q$, and $p$ and $q$ are integers greater than one; characterized in that beam guidance is obtained by focusing members common to all of said beams.

2. The system according to claim 1 wherein said waveguide comprises a plurality of spaced lenses.

3. The system according to claim 2 wherein said lenses are confocally spaced.

4. In an optical beam guidance system, the combination comprising:

a waveguide providing continuous focusing along its entire length;

means for spacially multiplexing a plurality of $N$ beams for propagation along said waveguide; said multiplexing means comprising:

means for directing $p$ groups of $q$ beams each onto $p$ separate common regions lying in a first nodal plane along said waveguide; and said beams thereafter reforming under the focusing influence of said waveguide into $q$ groups of $p$ beams each at the second and successive even nodal planes along said waveguide, and into $p$ groups of $q$ beams each at successive odd nodal planes along said waveguide;

means located at the last nodal plane along said waveguide for resolving said grouped beams into $N$ independently directed beams, where $N = p \times q$, and $p$ and $q$ are integers greater than one; characterized in that beam guidance is obtained by focusing means common to all of said beams.